Patented Aug. 29, 1933

1,924,185

UNITED STATES PATENT OFFICE 1,924,185

GAS PURIFICATION MATERIAL AND METHOD OF USING THE SAME

Herbert A. Gollmar, East Orange, N. J., assignor to The Koppers Company of Delaware, a Corporation of Delaware No Drawing. Application March 7, 1927
Serial No. 173,613

6 Claims. (Cl. 252—2.5)

This invention relates to processes and materials for the purification of gases from hydrogen sulphide and analogous acidic impurities. My invention relates especially to gas purification processes involving recirculation of an alkaline solution containing a compound of arsenic through a system comprising an absorption stage and an actification stage. Such a process is set forth in the copending application of David L. Jacobson, Serial No. 146,571, filed Nov. 5, 1926. In my copending application Serial No. 146,569, also filed Nov. 5, 1926, I describe and claim a modification of such process wherein the active element is a thio-arsenic compound in alkaline solution.

For convenience, I shall hereinafter designate a process of gas purification of the same general character as those referred to above as an "alkaline arsenic process".

An object of my invention is to provide an efficient and advantageous method of operating a gas purification process.

A second object of my invention is to provide a material that is effective to maintain the strength of gas purification solutions of the character indicated.

A further object of my invention is to provide an advantageous method of making necessary additions of alkali and arsenic compound to a gas purification system.

A further object of my invention is to provide a method for making up the original solution used for gas purification according to the alkaline arsenic process and especially for initial operation of such a process.

My invention has for further objects such other operative advantages or results as may hereinafter be found to obtain.

As hereinabove pointed out, a gas purification system employing the alkaline arsenic process is comprised of an absorption stage and an actification stage. In the absorption stage, the gas containing hydrogen sulphide, hydrogen cyanide and carbon dioxide, is purified by contact with an alkaline arsenic solution passed through it in counter-current. In the actification stage, the solution fouled by contact with the gas is revivified, preferably by aeration with finely comminuted air. After removal of the sulphur liberated by aeration, the revivified solution is recirculated through the absorption stage for purification of additional quantities of gas. The process is thus seen to be cyclic and continuous in character. Additions of alkali and arsenic compound are made to make up for mechanical losses and for losses due to side reactions. I have found it preferable to maintain about 0.8% of arsenic (considered as $As_2O_3$) in the solution, although a range of from 0.5% to 1.0% gives good results, and stronger solutions may be used when desired.

Although the alkalinity of my solution is not a true index of the concentration of sodium, I have found that an alkalinity of from about 0.05% to about 0.1% is preferable. In practice, however, it has been found that the presence of insufficient sodium results in the precipitation of a yellow substance which causes a discoloration of the normally white sulphur foam in the surface of the liquid in the thionizer, and when this precipitate or discoloration appears, it is desirable to add sufficient alkali to eliminate it.

In operating such a process and especially in its initial stages of operation, it is highly desirable to have alkali and arsenic present in a definite proportion. On this account, it is very undesirable to rely upon those unskilled in the art to make the necessary additions to the system and this is particularly true when no chemical control is provided. Mistakes in the preparation and maintenance of the gas purification solution cause many operating difficulties and may prove costly before proper adjustments can be made.

Moreover, arsenic comounds, such as arsenous oxide, are difficultly soluble, even in alkaline solution. It is particularly difficult to "wet" arsenous oxide with a cold sodium carbonate solution. If arsenous oxide is added to a dissolving tank containing a previously prepared solution of sodium carbonate, the oxide floats upon the surface of the liquid, crawls up and adheres to the sides of the tank and is reduced to solution only after prolonged agitation and heating.

I have found that it is highly advantageous to mix the necessary ingredients for an alkaline arsenic gas purification process under trained supervision and chemical control and to supply gas purification material prepared in this manner to the plants where it may be used for the preparation and maintenance of the gas purification solution.

I have also found that a mixture of alkali and arsenic compound is relatively easily soluble and that its use not only prevents improper proportions of ingredients in the solution, but also facilitates the preparation and maintenance of said solution.

Although sodium carbonate and arsenous oxide are to be preferred as specific materials for the preparation of my gas purification material, other alkali metal compounds and other arsenic compounds may be used successfully.

It is to be noted that arsenous oxide and sodium carbonate are not per se the active substances relied upon for removal of hydrogen sulphide from a gas, subsequent liberation of sulphur, and revivification of the active substance upon aeration of the solution. In my copending application, Serial No. 146,560, hereinabove mentioned, it is stated that it was desirable to have arsenic present in the form of a thio compound,—i. e., in a partially sulphided state, and that an initial ratio of three or more atoms of sodium per atom of arsenic in solution was desirable in order to bring about the formation of a sodium thio-arsenic compound.

I have since discovered that a fully active thio-arsenic compound may be prepared when the ratio of sodium or other alkaline element and arsenic is as low as two sodium atoms per atom of arsenic. Although solutions containing higher proportions of sodium are operative, it is generally preferable to use a minimum amount of sodium compound. For this reason, the composition of my material and the method of introducing it into the gas purification system will vary according to the specific alkaline and arsenic compounds used. Without limiting my invention in any way to a chemical theory, which, although reasonably probable, may be subject to modification upon further investigation, it will nevertheless be of assistance in comprehending the details of my invention with respect to various specific alkalis and arsenic compounds to set forth some of the theoretical variations and reactions apparently involved in bringing the alkaline element and the arsenic into proper form for gas purification purposes.

In my above-mentioned copending application, I show that a solution of sodium arsenite can be sulphided and then aerated without liberation of free sulphur or hydrogen sulphide. This solution is then capable of absorbing further hydrogen sulphide and, upon further aeration, is revivified with liberation of free sulphur. The last two steps of sulphidation and revivification may be repeated indefinitely. This sequence of phenomena indicates that the active arsenic element produced by initially sulphiding and aerating a solution of sodium arsenite is a thio-arsenic compound. It is desired to create and maintain such compound in the gas purification system, and my preparation is so composed and used as to cause this active compound to be formed as quickly and with as little trouble as possible.

When my material is to be used for making up the initial solution to be used in a gas purification plant, in order that an active compound may be produced as promptly and cheaply as possible, I prefer to mix substantially equal parts by weight of sodium carbonate and arsenous oxide. This proportion is based upon a ratio of 2 moles of sodium carbonate per mole of arsenous oxide, in pure form, and will vary somewhat according to the actual strength of the materials used, as will be apparent to those skilled in the art. The ingredients are simply intimately mixed together.

My material, prepared in the above proportion, is preferably brought into solution by heating, the reaction probably being as follows:

(1) $2Na_2CO_3 + As_2O_3 + H_2O = 2NaAsO_2 + 2NaHCO_3$.

Boiling this solution causes the evolution of $CO_2$, thus (2) $2NaAsO_2 + 2NaHCO_3 = 2Na_2HAsO_3 + 2CO_2$.

When this solution is brought into contact with gas containing hydrogen sulphide, the latter is absorbed, probably as follows:

(3) $2Na_2HAsO_3 + 6H_2S = 2Na_2HAsS_3 + 6H_2O$.

In making up the original solution, it is preferable to boil the solution to eliminate $CO_2$, but subsequently, boiling may be eliminated, as it has been found that the absorption of $H_2S$ causes a gradual elimination of $CO_2$, and combination of the steps indicated in reactions (2) and (3).

Aeration of the sulphided solution does not cause the liberation of either free sulphur or hydrogen sulphide, and probably takes place thus:

(4) $2Na_2HAsS_3 + O_2 = 2Na_2HAsS_3O$.

The partially sulphided compound resulting from reaction (4) is a sodium thio-arsenate, and is such a compound as will be active in absorbing further hydrogen sulphide, and which may be revivified by aeration or the like, without liberation of hydrogen sulphide, thus:

(5) $2Na_2HAsS_3O + 2H_2S = 2Na_2H_3AsS_4O$, and (6) $2Na_2H_3AsS_4O + O_2 = 2Na_2HAsS_3O + 2H_2O + 2S$.

Sulphidation and revivification, as represented by reactions (5) and (6), respectively, may be repeated indefinitely.

In making up the original gas purification solution, I prefer to dissolve enough of my material in water to produce a solution containing approximately 0.8% of arsenic, considered as $As_2O_3$, though other strengths may be used, as recited hereinabove.

My material, in the proportions above recited, is particularly suitable for making up the initial solution used for gas purification, and may be used, during subsequent operation, for maintaining the strength of the solution. However, for such subsequent use, my material may be prepared with less alkali, as, for example, by mixing substantially one part by weight of sodium carbonate and two parts by weight of arsenous oxide. This corresponds to a ratio of one mole of $Na_2CO_3$ per mole of $As_2O_3$. Solution of this material is preferably effected by boiling, thus:

(7) $Na_2CO_3 + As_2O_3 = 2NaAsO_2 + CO_2$

Excess alkali already present in the system or supplemental additions thereof is relied upon for the conversion of the $NaAsO_2$ into $Na_2HAsO_3$, according to reaction (2). The subsequent reactions (3) to (6) inclusive occur as before.

By reason of the fact that solution of my latter material is best effected by boiling, I prefer to dissolve this material in water by boiling, and to add the resultant solution to the gas purification system, preferably at such point that the newly prepared solution passes into contact with the hydrogen sulphide-laden gas prior to aeration, i. e., at the inlet to the absorber.

I have also found that batch additions of my material, or solutions thereof, to a gas purification system, result in increased consumption of the ingredients and more particularly of the alkali. For this reason, I prefer to make the necessary additions at as low and uniform a rate as is possible. This can be done by allowing a suitable solution of my material to flow slowly and uniformly into the gas purification system at approximately such rate as to compensate for losses, i. e., to maintain the desired constant strength of the solution. Should supplemental additions of alkali be required, they are also preferably added in this way, either by dissolving the supplemental sodium carbonate in the solution of my material, or by adding a sodium carbonate solution concurrently therewith. However, batch additions of alkali or a solution thereof are preferable when the color of the solution or the foam shows that a deficiency of alkali metal exists, and it is desired to correct such condition promptly.

It should be noted that I do not intend that a gas purification plant using my material should depend wholly upon it. My material is devised and intended to be used to bring about the formation of a particularly active form of arsenic compound, and has further advantages in that solution of arsenous oxide or other arsenic compound is facilitated. However, it is not intended that the alkali requirements of a gas purification plant be supplied solely through additions of my material.

Alkali consumption, due to mechanical losses, formation of sodium thiocyanate and thiosulphate and the like, is compensated for by adding such supplemental amounts of alkali as are required, independent of the addition of arsenic compound, or mixture of alkali and arsenic compound. This excess alkalinity, although slight, insures efficient absorption of hydrogen sulphide and hydrogen cyanide, and makes it possible, after the initial stages of plant operation, i. e., after liberation of sulphur in the actification stage has commenced, to use a material containing less alkali than is required during the initial stages of operation.

With regard to the specific alkali and arsenic compound used in the preparation of my material, it is preferable to so vary the actual amounts of such ingredients that the mixture will contain substantially two atoms of sodium per atom of arsenic, when the material is intended for use in initial operation, and one atom of sodium per atom of arsenic, when the material is to be used for subsequent operation. Thus, twice as many moles of NaOH will be required as of $Na_2CO_3$, i. e., four moles of NaOH per mole of $As_2O_3$, in the case of the material used for initial operation. Other sodium compounds, such as sodium sulphide, may be used, and other alkali metals, such as potassium or the ammonium radical, and their compounds, may also be used. So also other arsenic compounds, such, for example, as arsenous sulphide, may be used, in conjunction with any of the suitable alkaline compounds. It will further be understood that arsenic may be replaced by tin, antimony, or any other compound of the tin group of qualitative analysis.

My invention provides a method of operating a gas purification system, which insures the formation of a desirable and active compound, and facilitates addition of ingredients necessary to said system. It further provides a material, in convenient form, whereby such operation and addition of ingredients, may be facilitated and cheapened.

My invention is not limited to any specific examples given hereinabove by way of illustration, but is to be construed as of the scope of the following claims.

I claim as my invention:

1. A solute material adapted to form a gas purifying solution that comprises an intimate mixture of substantially equal parts of arsenous oxide and sodium carbonate.

2. A solute material adapted to form a gas purifying solution that comprises a mixture of an arsenic compound and a sodium compound in such proportion as to contain between not less than two and less than three atoms of sodium per atom of arsenic.

3. The method of producing a gas purification liquid containing a thio-arsenic compound capable of being sulphided and subsequently revivified, which comprises dissolving a previously prepared mixture of a compound of an alkali metal and a compound of arsenic, in a ratio of less than three and at least two alkali metal atoms to one arsenic atom, in water, heating said solution, sulphiding said solution and aerating the same.

4. The method of maintaining the strength of a solution of an alkali arsenic compound used for gas purification, which comprises adding thereto a previously prepared intimate mixture of an alkali metal compound and an arsenic compound in such ratio as to contain less than three and at least two atomic weights of alkali metal for each atomic weight of arsenic.

5. The method of producing a gas purification liquid containing a thio-arsenic compound capable of being sulphided and subsequently revivified, which comprises dissolving a previously prepared mixture of sodium carbonate and arsenous oxide, in a ratio of less than three and at least two alkali atoms to one arsenic atom, in water, heating said solution, sulphiding said solution and aerating the same.

6. The method of maintaining the strength of a solution of an alkali arsenic compound used for gas purification, which comprises adding thereto a previously prepared intimate mixture of sodium carbonate and arsenous oxide in equal parts of sodium carbonate and arsenous oxide.

HERBERT A. GOLLMAR.